United States Patent [19]
Falk

[11] Patent Number: 5,221,877
[45] Date of Patent: Jun. 22, 1993

[54] POWER REDUCTION CONTROL FOR INDUCTIVE LIGHTING INSTALLATION

[75] Inventor: Keith R. Falk, Wheeling, Ill.

[73] Assignee: Davis Controls Corporation, Rolling Meadows, Ill.

[21] Appl. No.: 848,918

[22] Filed: Mar. 10, 1992

[51] Int. Cl.$^5$ .............................................. G05F 1/00
[52] U.S. Cl. .................................. 315/291; 315/293; 315/DIG. 7; 307/141
[58] Field of Search ................. 315/291, 293, DIG. 7; 307/141

[56] References Cited

U.S. PATENT DOCUMENTS

| | | | |
|---|---|---|---|
| 3,539,812 | 11/1970 | Johnson | 315/291 |
| 4,147,961 | 4/1979 | Elms | 315/291 |
| 4,350,935 | 9/1982 | Spira | 315/291 |
| 4,453,123 | 6/1984 | Erkman | 315/291 |

*Primary Examiner*—Robert J. Pascal
*Assistant Examiner*—R. Ratliff
*Attorney, Agent, or Firm*—Kinzer, Plyer, Dorn, McEachran & Jambor

[57] ABSTRACT

A control system for reducing power used by an inductive lighting installation, usually plural fluorescent lamps and a ballast, includes an A.C. power input circuit to the installation with a signal-actuated, normally-closed primary switch in series in the circuit; a signal-actuated normally-open secondary switch is in shunt with the load. The two switches are actuated substantially simultaneously in each half-cycle of the A.C. power input, once for power reduction for a time interval T1-T2 and once for harmonic distortion reduction for a time T3-T4 that encompasses each A.C. power zero-crossing time TX. The control system has N different timing programs for times T1-T2 and T3-T4, each program corresponding to one type of ballast. In each program times T3 and T4 are constant; only the times T1 and T2 are varied for a series of successively greater power reductions; the maximum power reduction may be as much as 30 to 40 percent. The system is provided with protection circuits to protect against unusual line or load voltage or current conditions.

10 Claims, 6 Drawing Sheets

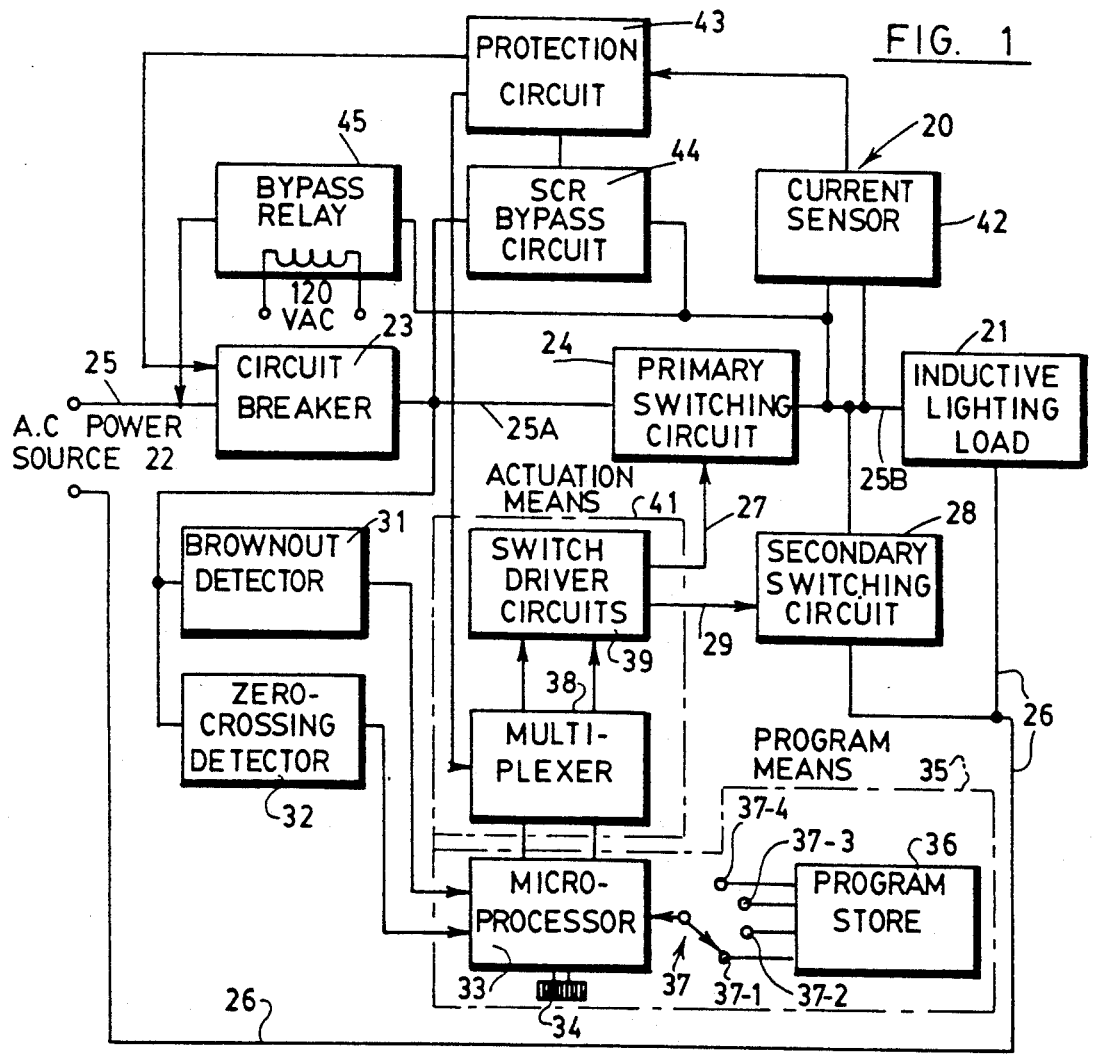
FIG. 1
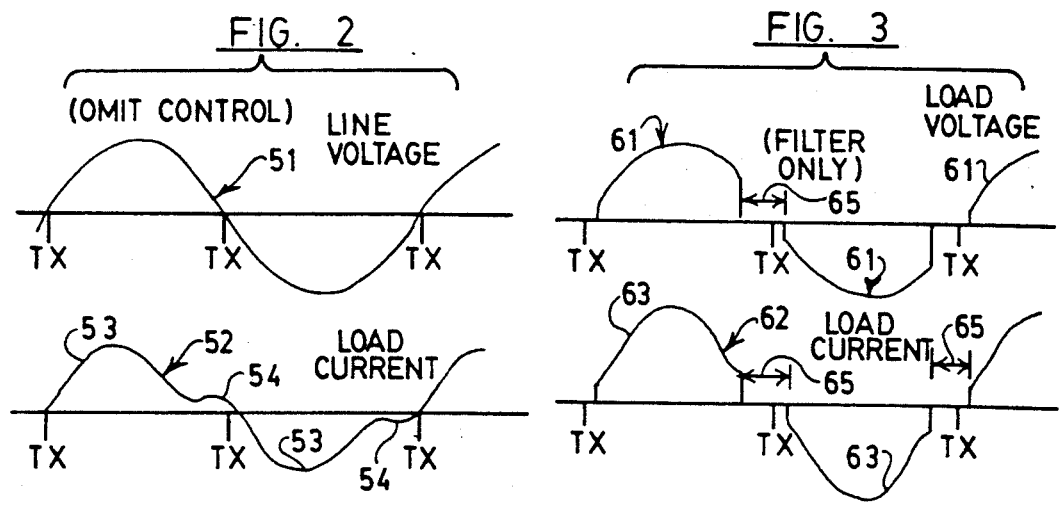
FIG. 2
FIG. 3

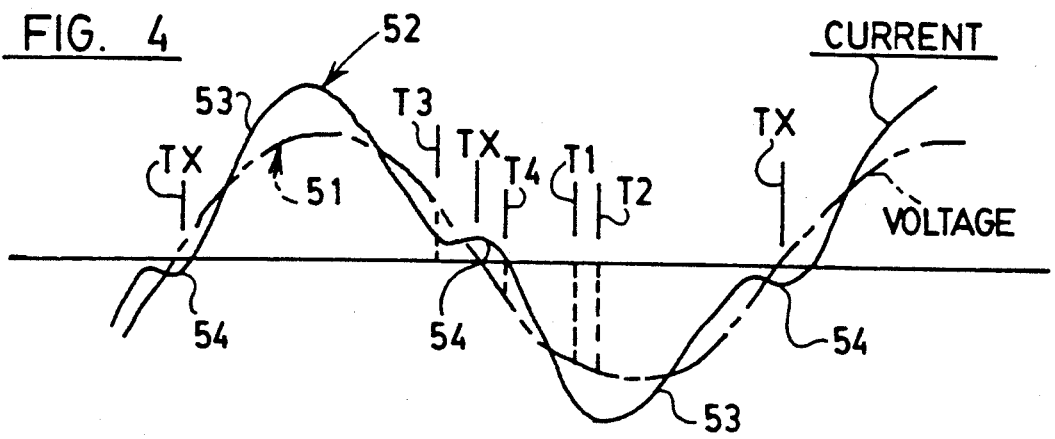
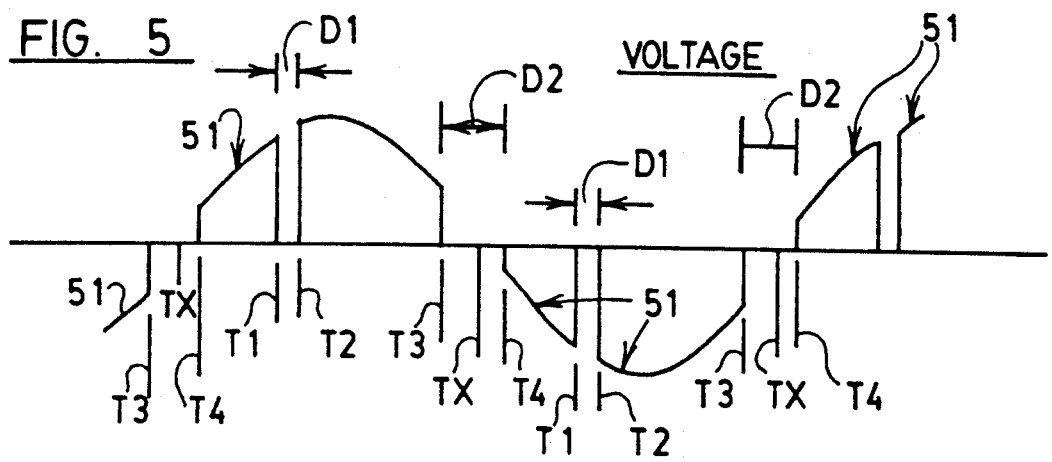
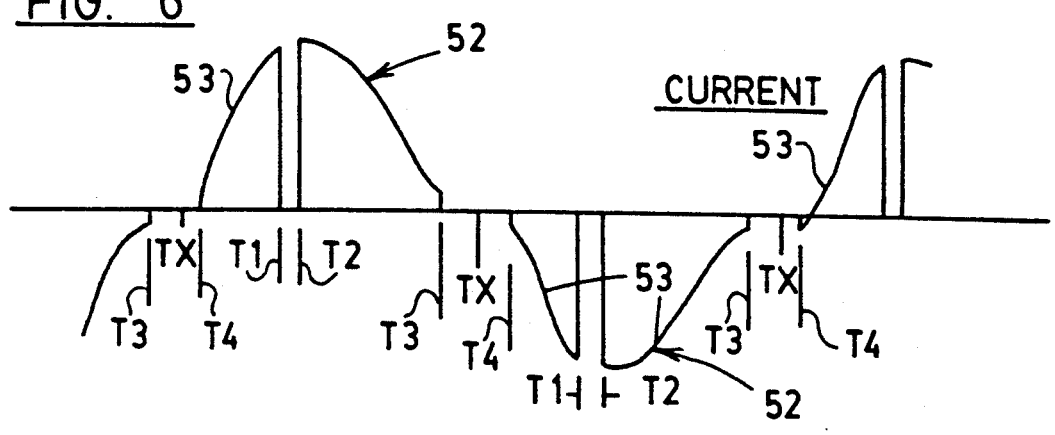

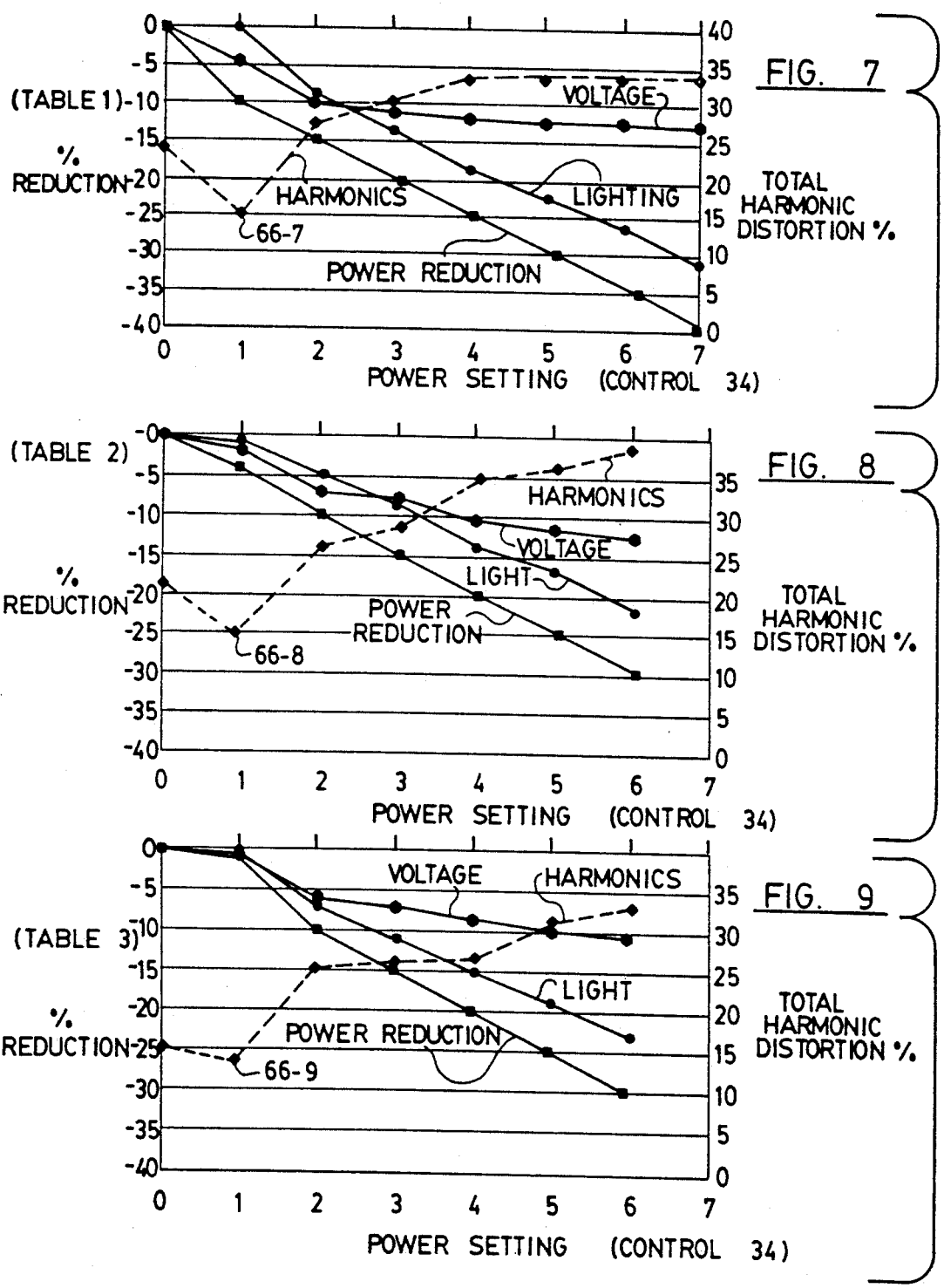

POWER REDUCTION CONTROL FOR INDUCTIVE LIGHTING INSTALLATION

BACKGROUND OF THE INVENTION

A commonly used type of lighting installation includes a plurality of fluorescent lamps supplied with A.C. power through one or more electromagnetic ballasts. One ballast often serve several fluorescent lamps, and a complete installation may include a number of ballasts. Any such lighting installation comprises an inductive load, for which the overall harmonic distortion may be appreciable. As in any electrical system there may be load line faults or short circuits; moreover, in some instances any such installation may receive a surge of electrical power at an excessive voltage or a power input at an undesirably low voltage. All of these operational variations create problems for the inductive lighting installation; harmonic distortion, in particular can present substantial difficulties for other equipment (e.g., computers, calculators, and other office or technical apparatus) supplied from the same A.C. power source.

These problems associated with inductive lighting loads are exacerbated if a power reduction control is employed to reduce power consumption or if a light output control (dimmer) is superimposed on the installation. Previously known power reduction controls have a tendency to increase the overall distortion reflected back into the system. Indeed, harmonic distortion usually increases with each incremental stage of additional power reduction. Similarly, harmonic distortion increases result from successive stages of dimming control in any system utilized to regulate the light output of fluorescent lamps or like lighting installations. The distortion problems vary for different types of ballasts, but they are always present; for commercial purposes, a power reduction system should be able to perform effectively with several different ballast types.

SUMMARY OF THE INVENTION

It is a principal object of this invention, therefore, to provide a new and improved power reduction control system for reducing power consumption with minimal harmonic distortion in an inductive lighting load, such as plural fluorescent lamps energized through any of a plurality of different types of electromagnetic ballast.

Another object of the invention is to provide a new and improved power reduction system, applicable to several different forms of inductive lighting load, that reduces the harmonic distortion of the load, for at least one power reduction level, relative to the distortion that would occur if the power reduction system were not present.

A further object of the invention is to provide a simple, economical power reduction system for an inductive lighting load that affords improved performance over a substantial period of time, particularly as regards harmonic distortion.

Accordingly, the invention relates to a control system for reducing power consumption in an inductive lighting installation energized from an A.C. power source, the installation including at least one gas discharge lamp such as a fluorescent lamp energized through any of a plurality of different types of electromagnetic ballast having different harmonic distortion characteristics. The control system comprises load energizing circuit means, including a signal-actuated normally-closed primary switch, for connecting an A.C. power source to the lighting installation, signal-actuated, normally-open secondary switch connected in parallel with the lighting load, and actuation means for generating actuation signals and applying such actuation signals to the switches to actuate the primary switch open and to actuate the secondary switch closed in approximate time coincidence. A zero-crossing detector means generates zero-crossing signals at times TX indicative of half-cycle zero-voltage transitions in the A.C. power. The system further comprises program means, connected to the zero-crossing detector means and to the actuation means, for operating the actuation means to generate (a) power reduction actuation signals at times T1 and T2 in each half-cycle of the A.C. power, (b) a first filter actuation signal at a time T3 prior to each zero-crossing time TX, and (c) a second filter actuation signal at a time T4 following each zero-crossing time TX.

The program means includes a plurality of programs each establishing a set of times T1, T2, T3 and T4 several different power reduction levels for a particular type of ballast, together with selection means for selecting a program to match the ballast type of the load.

BRIEF DESCRIPTION OF THE DRAWINGS

FIG. 1 is a block diagram of a power reduction control for an inductive lighting installation according to a preferred embodiment of the invention;

FIG. 2 illustrates typical voltage and load current waveforms for an inductive lighting installation having no power reduction control;

FIG. 3 illustrates the waveforms of FIG. 2 with interruptions for harmonic reduction;

FIG. 4 illustrates typical voltage and load current waveforms like FIG. 2, superimposed on each other;

FIGS. 5 and 6 illustrate voltage and current waveforms, respectively, for the control system of FIG. 1;

FIGS. 7, 8 and 9 provide charts of three different operating programs for the control system of FIG. 1, corresponding to Tables 1, 2 and 3, respectively, in the specification.

DESCRIPTION OF THE PREFERRED EMBODIMENTS

Figures 10, 11:
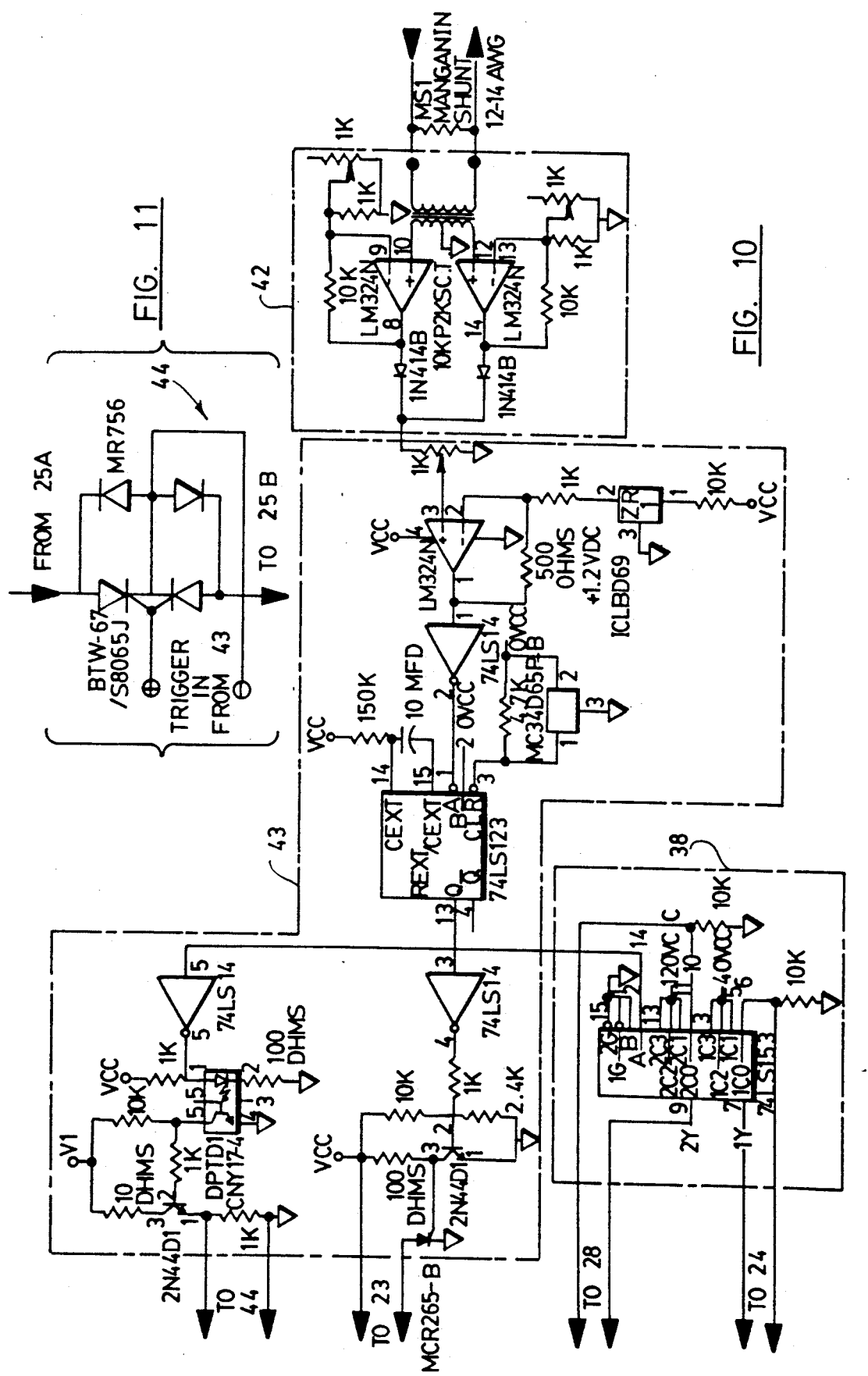
FIGS. 10-14 afford schematic circuit diagrams for the operating circuits of the control system of FIG. 1.

FIG. 1 is a block diagram of a control system 20 for reducing the power consumption in an inductive lighting installation or load 21 energized from an A.C. power source 22. System 20 represents a preferred embodiment of the present invention. The lighting installation 21 includes at least one gas discharge lamp energized through one of a plurality of different types of electromagnetic ballast. Typically, installation 21 includes a plurality of fluorescent lamps energized through one or more ballasts of one specific type. The ballasts incorporated in load 21 may be of the standard magnetic core type, they may be the Power Saver type, or they may be Powrkut ballasts. Other types of ballasts may be utilized. Control system 20 minimizes harmonic distortion in the operation of the inductive lighting load 21 and also minimizes reduction or loss of light from installation 21 throughout the power reduction range of the system. The maximum power reduction of system 20 may be thirty or even forty percent.

The circuit means for energizing the inductive lighting load 21 from A.C. power source 22 includes a circuit breaker 23 and a primary switch circuit 24 in series in an input line that includes sections 25, 25A and 25B. The input line starts at power source 22 and extends to load 21. A return line 26 goes from the lighting installation 21 back to A.C. power source 22. The primary switching circuit 24 is a signal-actuated normally-closed switch having an actuation input 27. Control system 20 includes another signal-actuated switching circuit, the secondary switching circuit 28 connected in parallel with load 21 between its input 25B and output line 26. The secondary switching circuit 28 comprises a normally-open switch; it has an actuation signal input 29.

Control system 20, FIG. 1, further includes a brown-out detector 31 and a zero-crossing detector circuit 32, both connected to circuit 25A to monitor the power input voltage from source 22 to installation 21. Brown-out detector 31 is responsive to a low voltage condition on line 25. Zero-crossing detector 32 is responsive to the half-cycle transitions or zero-crossings in the voltage of the A.C. power input to control system 20. Upon occurrence of a low voltage condition, brown-out detector 31 supplies an input signal to a microprocessor 33. Each time the input A.C. power from source 22 passes through zero, the zero-crossing detector 32 supplies an input signal to microprocessor 33.

Microprocessor 33 is part of a program means 35 incorporated in control system 20, FIG. 1. Program means 35 further comprises a program store or memory 36 that stores at least one program of switch actuation times T1-T4 for a sequence of power reduction settings for each different kind of ballast that might be incorporated in the inductive lighting load 21. For system 20 it is assumed that there are four different programs recorded in program store 36 and that, at any given time, just one of these programs is accessed, to microprocessor 33, through one of four program outputs 37-1 through 37-4 constituting the terminals of a selector switch 37. It should be understood that the representation of microprocessor 33, store 36, and selector 37 is entirely schematic. In actual fact, the program memory or store 36 is most likely to be part of an integrated circuit that includes microprocessor 33, with internal selection in the IC to perform the function of selection means 37. Microprocessor 33 is shown with a stepped power-reduction level selection control 34, for which the representation is again wholly schematic. Any one of several power reduction levels can be selected for each program, using control 34, as explained hereinafter.

Control system 20 further comprises actuation means 41 including a multiplex circuit 38 and switch driver circuits 39. The working inputs to multiplexer 38 are derived from microprocessor 33 of program means 35. The outputs of multiplexer 38 are supplied to switch driver circuits 39, in turn connected to the normally closed primary switching circuit 24 and the normally open secondary switching circuit 28. The actuation signals supplied to switching circuits 24 and 28 from driver means 39 are used to actuate the primary switch 24 to open condition substantially simultaneously with actuation of the secondary switch 28 to closed condition, and vice-versa. A principal requirement of the timing of the switch actuation signals on lines 27 and 29 to switching circuits 24 and 28 is that switch 28 should not be actuated closed before switch 24 is open in order to avoid a short circuit with installation 21.

System 20, FIG. 1, further comprises protection circuits to preclude damage to lighting installation 21 and to the previously described components of the system in the event of faults, power surges, and other undesirable variations in operating conditions. Thus, a current sensor circuit 42 is included in system 20, connected to the energizing circuit conductor 25B immediately ahead of the inductive lighting installation 21. The output of current sensor 42 is supplied to a protection circuit 43 that generates protection signals in response to inputs from the current sensor indicative of unusual current conditions, particularly low current conditions. Outputs from protection circuit means 43 are applied to multiplexer 38, to circuit breaker 23, and to a bypass circuit 44 that is connected in parallel with the primary switching circuit 24. The protection circuitry of system 20 further comprises a bypass relay circuit 45 that is connected in shunt relationship to both circuit breaker 23 and primary switching circuit 24. Circuit 45 has a 120 volt input derived from A.C. power source 22; a transformer (not shown) is required if source 22 is 240 volts.

The basic operation of control system 20, FIG. 1, can best be understood by reference to FIGS. 2–9. FIG. 2 illustrates the normal voltage waveform 51 for A.C. power source 22, assumed to be a reasonably distortion-free sine wave. This is the voltage waveform that appears on line 25 (actually on lines 25 and 26) and that is supplied to the inductive lighting installation or load 21 through circuit breaker 23 and the normally-closed primary switching circuit 24, FIG. 1. As long as the primary switch 24 stays closed, and if it is assumed that circuit breaker 23 is closed as it would be for normal operation of control system 20, then waveform 51 of FIG. 2 represents the line voltage supplied to the inductive lighting load 21. The representation of waveform 51 in FIG. 2 includes one complete cycle, comprising two half-cycles with three zero-crossing times TX shown.

FIG. 2 also includes another curve 52 that is representative of the waveform for the load current of the inductive lighting load 21 resulting from a line voltage having the waveform 51, again without modification by control system 20. As is clearly apparent, the current waveform 52 does not match the voltage waveform 51. Instead, the inherent distortion introduced by the inductive lighting installation 21 results in an early peak 53 in each half-cycle of the current waveform, followed by a much smaller peak or "knee" that starts before the crossover time TX in each half-cycle and that ends after the zero-crossing time TX. Thus, FIG. 2 illustrates the kind of inherent harmonic distortion that is produced by an ordinary fluorescent lighting load energized through a conventional ballast. The type of ballast employed and, to a limited extent, the type of fluorescent lamps utilized, affect the configuration of the current waveform 52, particularly the amplitude and duration of the knee 54. Stated differently, the knee 54 and to some extent the configuration of the main peak 53 in each half-cycle are different for each different type of ballast. Under any circumstances, however, the harmonic distortion due to the inductive lighting load is substantial. Of course, the situation may be even worse if the input voltage 51 also has appreciable harmonic distortion.

FIG. 3 illustrates a technique that is used in control system 20 to modify the waveforms for the power utilized in inductive lighting load 21 to reduce current distortion and, in fact, to minimize the total harmonic distortion. Referring to the upper curve 61 in FIG. 3, this load voltage is the same as curve 51 of FIG. 2 except that now primary switching circuit 24 (FIG. 1) is open for a time interval 65 spanning each zero-crossing time TX. During these same time intervals 65, secondary switching circuit 28 is closed so that there is a shunt circuit in parallel with the inductive lighting load 21. For these conditions, the load current waveform 62 in the lower portion of FIG. 3 applies. It can be seen that the load current waveform 62 is generally similar to the load current curve 52 of FIG. 2 except that the knee portions 54 in the original load current waveform are pretty well eliminated. The end result is a substantial reduction in harmonics in the current waveform 62, counterbalanced in part by an increase in harmonic distortion in the voltage wave 61 with appropriate selection of the timing of the intervals 65, the overall result may be a reduction in total harmonic distortion.

FIG. 3 represents the voltage and current conditions for an initial setting of microprocessor 33, setting 1, effected by the setting of control 34, FIG. 1, that programs switching circuits 24 and 28 to open and closed conditions, respectively, during each time interval 65. The total harmonic distortion reduction is indicated at point 66-7 in FIG. 7, based on a program for a conventional or standard type of ballast. The corresponding point 66-8 in FIG. 8 shows the reduction in total harmonic distortion for a program keyed to the characteristics of Power Saver ballasts. Point 66-9 shows the total harmonic distortion reduction for a program based on the operating characteristics of Powrkut ballasts. As seen in FIGS. 7-9, the overall harmonic distortion reduction effected by control system 20 at the first setting for control 34 is dependent to a substantial extent upon the kind of ballast employed in inductive load 21, ranging from as much as a ten percent reduction for a standard ballast (point 66-7) to about four percent (point 66-8) for a Power Saver ballast and just about two percent for a Powrkut ballast. It is worth noting, however, that in each instance the total harmonic distortion is reduced by the "filter chop" operation of system 20 at its initial setting, producing the waveforms illustrated in FIG. 3.

FIG. 4 has the line voltage waveform 51 superimposed upon the load current waveform 52 with the amplitudes of the two waveforms such that they are readily distinguishable. Thus, the voltage waveform 51 is still shown as an essentially undistorted sine wave, with two adjacent half-cycles of the wave illustrated in the drawing and three zero-crossing transitions times TX indicated. The load current waveform 52 has the same main lobes 53 in each half-cycle as before, with a smaller lobe or "knee" 54 beginning before and ending after each zero-crossing TX. Thus, to eliminate each knee 54 system 20 actuates switching circuits 24 and 28 to open switch 24 and close switch 28 during each time interval from a time T3 to a time T4; this is the same action as indicated in FIG. 3. However, for effective power reduction in the operation of inductive lighting installation 21, the excitation power supplied to installation 21 is cut off in each half-cycle of waveforms 51 and 52. The power reduction time is the interval T1-T2 in each half-cycle, a time interval which should be timed to occur during the main lobe 53 in each half-cycle of the load current and preferably in the initial portion of each such half-cycle.

FIG. 5 illustrates the basic operation of control system 20, for any setting of that control system by control 34, for the A.C. energization voltage supplied to inductive lighting load 21. Thus, at a first time T3 prior to the first half-cycle crossover time TX, the primary switching circuit 24, FIG. 1, is opened and the secondary switching circuit 28 is closed; this condition is maintained until time T4, FIG. 5. Thereafter, in the illustrated positive-going half-cycle of A.C. voltage waveform 51, the switching circuits 24 and 28 are again actuated, at a time T1, opening switch 24 and closing switch 28. At a subsequent time T2 the primary switching circuit 24 is actuated to revert to its normal closed condition and the secondary switching circuit 28 goes back to its normal open condition. Subsequently, and still in the first or positive-going half-cycle of waveform 51 shown in FIG. 5, at time T3 the switches 24 and 28 are again actuated. That actuation of switches 24 and 28 is again interrupted at time T4; the zero-crossing time TX occurs intermediate times T3 and T4.

The power reduction actuation signal from actuation means 41 (FIG. 1) again occurs at time T1 in the negative-going half-cycle and stops at time T2, FIG. 5. At time T3 in the same negative-going half-cycle of voltage curve 51, the filter actuation signal from means 41 is again effective to actuate switches 24 and 28 so that the switching circuits revert to their normal conditions at time T4, after the zero-crossing time TX. The time for each filter "chop" or actuation is the time D2, encompassing each zero-crossing transition time TX. The interval for power reduction is the time D1 in each half-cycle of the voltage waveform 51, FIG. 5.

FIG. 6 shows the current waveform 52, and the basic effect of normal operation of system 20 on that waveform, for any setting other than its initial filter-only setting. Starting from the left of FIG. 6, at the time T3 shortly before the zero-crossing time TX a filter actuation signal actuates the primary and secondary switches 24 and 28, with the actuation interval being ended at time T4 after time TX. In each cycle there is a power reduction actuation signal that is initiated at time T1 and interrupted at time T2.

Table 1 provides the complete timing for all power reduction levels of control system 20 for a single program from store 36, as selected by selector switch 37. It may be assumed that the setting is for program output 37-1 and is the program for a standard ballast. The left-hand "0" column in the table presents operating conditions as they would exist if the control system 20 were not present. The No. 1 or "filter" setting for the standard ballast program, determined by setting of the microprocessor selector control 34, corresponds to the operating conditions discussed above in relation to FIG. 3. The remaining settings No. 2 through No. 7 are for different power reduction level selections made by adjustment of the microprocessor selection control 34. Table 1 corresponds to the data presented graphically in FIG. 7.

TABLE 1

| | STANDARD BALLAST (37-1) | | | | | | | |
| --- | --- | --- | --- | --- | --- | --- | --- | --- |
| | F.P. | FILT | | | | | | |
| | 0 | 1 | 2 | 3 | 4 | 5 | 6 | 7 |
| DISTANCE TO T3 FROM ZERO CROSS TX mS | N/A | 6.92 | 6.92 | 6.92 | 6.92 | 6.92 | 6.92 | 6.92 |

TABLE 1-continued

| STANDARD BALLAST (37-1) | F.P. 0 | FILT 1 | 2 | 3 | 4 | 5 | 6 | 7 |
|---|---|---|---|---|---|---|---|---|
| FILTER CHOP WIDTH D2 mS | N/A | 1.89 | 1.89 | 1.89 | 1.89 | 1.89 | 1.89 | 1.89 |
| DISTANCE TO T1 FROM ZERO CROSS TX mS | N/A | N/A | 2.54 | 2.22 | 2.78 | 2.96 | 3.04 | 3.00 |
| POWER CHOP WIDTH D1 mS | N/A | N/A | 0.57 | 0.79 | 0.79 | 0.89 | 0.92 | 0.99 |
| POWER SAVINGS % | N/A | 10% | 15% | 20% | 25% | 30% | 35% | 40% |
| LIGHT REDUCTION % | N/A | 0% | 9% | 14% | 19% | 23% | 27% | 32% |
| TOTAL HARMONIC DISTORTION % | 24% | 15% | 27% | 30% | 33% | 34% | 34% | 34% |
| FUNDAMENTAL DISTORTION % | 25% | 15% | 28% | 31% | 36% | 36% | 36% | 36% |
| LOAD VOLTAGE (RMS) | 116.0 | 110.8 | 104.3 | 102.7 | 101.7 | 101.1 | 100.9 | 100.2 |

Table 2 provides data comparable to Table 1 for a second program setting of program means 35, in this instance a program relating to Power Saver ballasts. It may be assumed that the setting of selector 37 is to line 37-2 for this program. The data presented in Table 2 are represented in graphic form in FIG. 8.

TABLE 2

| POWER SAVER BALLAST (37-2) | F.P. 0 | FILT 1 | 2 | 3 | 4 | 5 | 6 |
|---|---|---|---|---|---|---|---|
| SAVINGS SETTING | | | | | | | |
| DISTANCE TO T3 FROM ZERO CROSS TX mS | N/A | 6.92 | 6.92 | 6.92 | 6.92 | 6.92 | 6.92 |
| FILTER CHOP WIDTH D2 mS | N/A | 1.89 | 1.89 | 1.89 | 1.89 | 1.89 | 1.89 |
| DISTANCE TO T1 FROM ZERO CROSS TX mS | N/A | N/A | 2.27 | 3.42 | 3.33 | 3.00 | 2.96 |
| POWER CHOP WIDTH D1 mS | N/A | N/A | 0.51 | 0.51 | 0.70 | 0.86 | 0.98 |
| POWER SAVINGS % | N/A | 4% | 10% | 15% | 20% | 25% | 30% |
| LIGHT REDUCTION % | N/A | 1% | 5% | 9% | 14% | 17% | 22% |
| TOTAL HARMONIC DISTORTION % | 21% | 15% | 26% | 28% | 34% | 36% | 38% |
| FUNDAMENTAL DISTORTION % LOAD VOLTAGE (RMS) | 115.9 | 113.7 | 107.6 | 106.7 | 103.6 | 102.2 | 101.0 |

Table 3 presents the operating data for a third program recorded in store 36, FIG. 1. This program is for use with ballasts of the Powrkut type and it may be assumed that it is accessed by setting selector switch 37 to line 37-3. For a graphic illustration of the data from Table 3, see FIG. 9.

TABLE 3

| POWRKUT BALLAST (37-3) | F.P. 0 | FILT 1 | 2 | 3 | 4 | 5 | 6 |
|---|---|---|---|---|---|---|---|
| SAVINGS SETTING | | | | | | | |
| DISTANCE TO T3 FROM ZERO CROSS TX mS | N/A | 7.69 | 7.69 | 7.69 | 7.69 | 7.69 | 7.69 |
| FILTER CHOP WIDTH D2 mS | N/A | 1.39 | 1.39 | 1.39 | 1.39 | 1.39 | 1.39 |
| DISTANCE TO T1 FROM ZERO CROSS TX mS | N/A | N/A | 2.20 | 2.70 | 3.07 | 3.33 | 3.00 |
| POWER CHOP WIDTH D1 mS | N/A | N/A | 0.68 | 0.68 | 0.70 | 0.81 | 0.92 |
| POWER SAVINGS % | N/A | 1% | 10% | 15% | 20% | 25% | 30% |
| LIGHT REDUCTION % | N/A | 0% | 7% | 11% | 15% | 19% | 23% |
| TOTAL HARMONIC DISTORTION % | 15% | 13% | 25% | 26% | 27% | 31% | 33% |
| FUNDAMENTAL DISTORTION % LOAD VOLTAGE (RMS) | 117.8 | 117.3 | 110.7 | 109.6 | 107.7 | 106.2 | 105.4 |

The program memory 36 in program means 35 may record one or more additional programs pertaining to any other type of ballast. One such additional program would be accessed, in the use of control system 20 of FIG. 1, by setting selector switch 37 to terminal 37-4. In any of the programs, increased power reduction is obtained by advancing control 34 to the higher numbered positions shown in the table for each program.

The basic programs of Tables 1-3 and FIGS. 7-9 have some common characteristics. Thus, in each program the time or "distance" from a zero-crossing time TX to the beginning of a filter "chop" for switch actuation at time T3 is constant. Furthermore, in each program the time interval D2 that constitutes the width of the "chop" utilized for filter purposes is a constant. Indeed, in the programs of Tables 1 and 2 the interval from time TX to time T3 at the beginning of each filter chop is also constant at 6.92 milliseconds and the width of the filter chop is constant at 1.89 milliseconds for all filter and power reduction settings covered by both programs. For the program of Table 3 the time from zero-crossing TX to the beginning of the filter chop at T3 is slightly longer, 7.69 milliseconds, and the overall filter chop width is slightly smaller at 1.39 milliseconds, reflecting the difference in operating characteristics for the particular type of ballast that the program of Table 3 is designed to match. On the other hand, the distance to the beginning time T3 for the filter actuation of the switches 24 and 28 is again a constant for all settings and the width of the filter chop, D2, is also constant for all settings.

The overall power reduction interruptions in the energizing A.C. connections to the inductive lighting load 21, however, are progressively varied because this is the part of the control program, in each instance, that changes the power reduction for the inductive lighting load. Referring to Table 1 and FIG. 7 for example, the time from the preceding zero-crossing point TX to the time T1 when the switches are actuated for power reduction varies over a range from 2.22 to 3.04 milliseconds; it is not a constant progression. The time interval D1 constituting the width of the power chop, T1-T2, also varies substantially, from 0.57 milliseconds to 0.99 milliseconds. The key to the program is that for each progressively higher setting of control 34 the timing and duration of the "power chop", T1, T2 and D1, are selected for progressively increasing power reduction. Similar conditions will be observed in each of the other programs, shown in Table 2 and Table 3.

Of course, the timing for all of these operations is based on the output signal from zero-crossing detector 32, which signals to microprocessor 33 each transition time TX at the beginning and end of each half-cycle of the A.C. power. Utilizing the relatively simple programs stored in memory 36, and shown in Tables 1–3; microprocessor 33 has little difficulty in driving multiplexer 38 and the associated switch driver circuits 39 to generate the requisite actuation signals supplied to switching circuits 24 and 28 on lines 27 and 29 respectively.

In the event that the power input to lighting installation 21, FIG. 1, exceeds a preset level, a high current condition is detected in current sensor 42 and a signal is supplied from sensor 42 to protection circuit 43. The protection circuit then supplies actuation signals to multiplexer 38, to bypass circuit 44, and to circuit breaker 23. The signal to multiplexer 38 operates to modify the multiplexer in operating driver circuits 39, so that switching circuits 24 and 28 are actuated to their normal off conditions, open for switch circuit 24 and open for switch 28. The signal to circuit breaker 23 from circuit 43 opens the circuit breaker. The signal to bypass circuit 44 actuates that circuit to bypass and protect the switching circuit 24 so that device is not damaged. The installation receives A.C. power as if control system 20 were not present.

Brownout detector 31 functions similarly, but more simply, on the basis of a reduced voltage input. It signals microprocessor 33 when a low voltage (brownout) condition occurs so that system 20 will not continue to maintain a reduced power input to lighting installation 21.

The bypass relay circuit 45 also protects system 20, but in the opposite direction; it is concerned with excessive power surges in the A.C. input from source 22. In the event of an increase, usually quite abrupt, in the input voltage, the input to relay circuit 45 actuates that circuit because its 120 volt input is derived from source 22. Bypassing switching circuit 23 protects that circuit against damage that could otherwise be incurred from voltage spikes, etc. occurring on the A.C. line 22.

Figure 12:
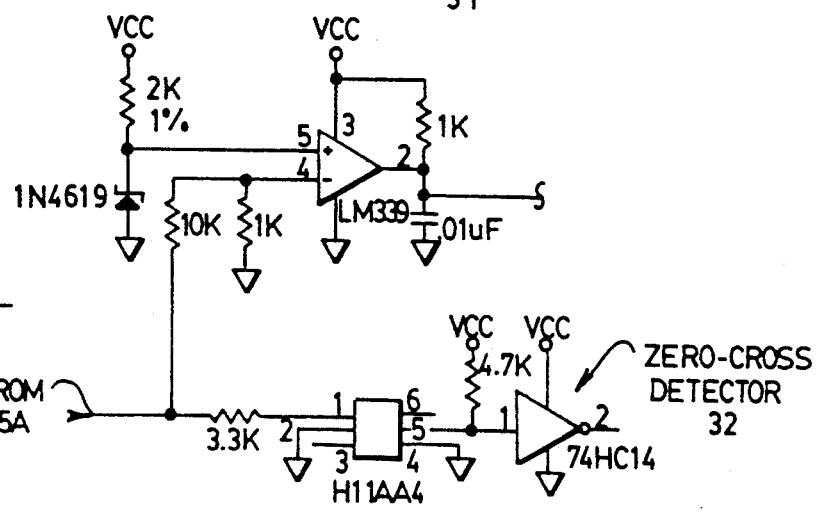
Figure 13:
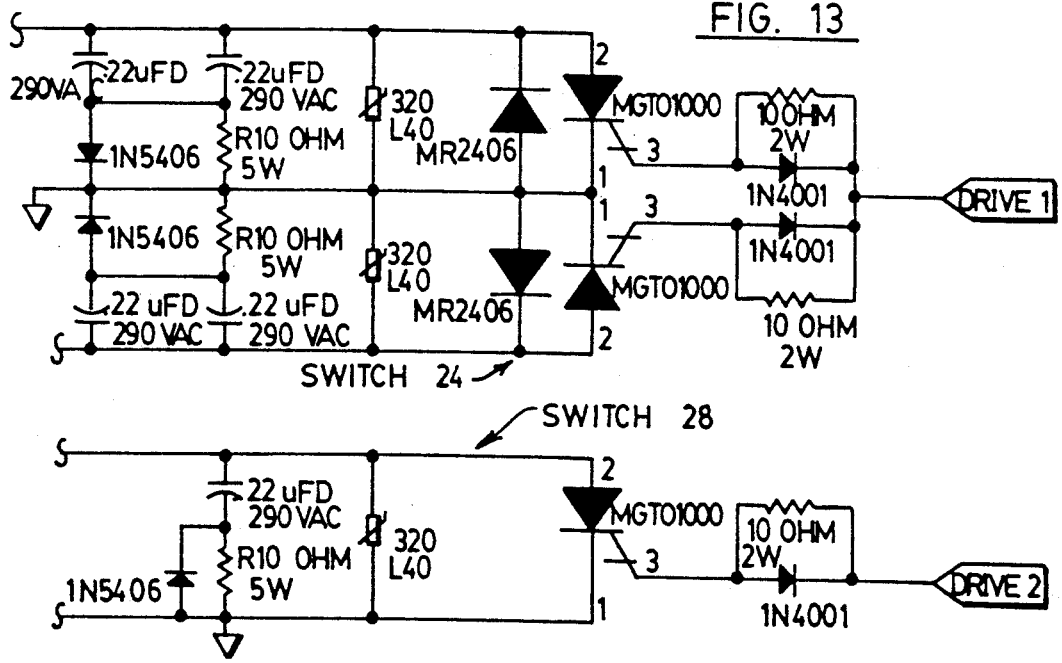
Figure 14:
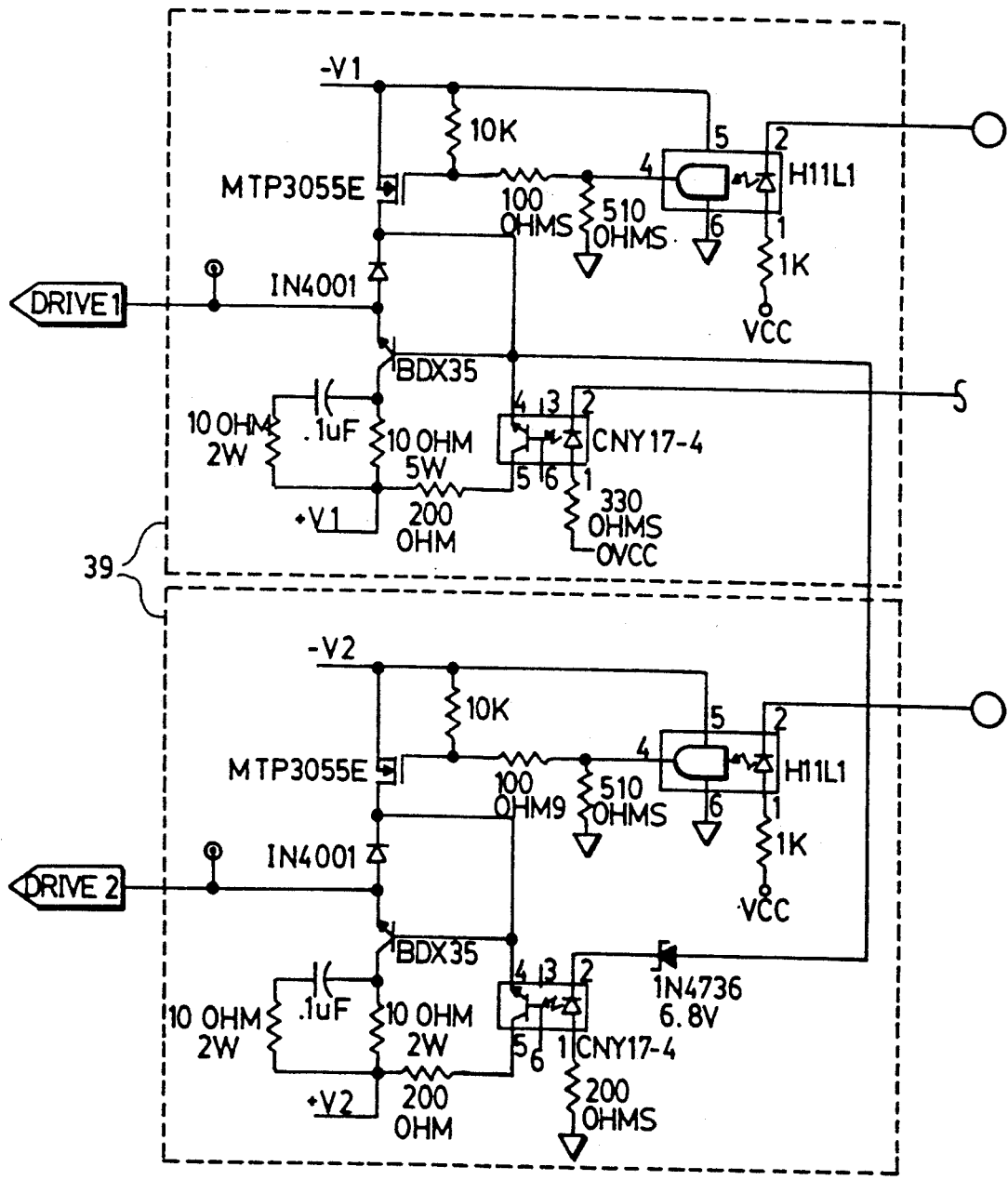

FIGS. 10-12 comprise schematic diagrams, including the parameters for circuit components, for operating circuits that may be used in implementing one embodiment of the control system 20 of FIG. 1. Thus, FIG. 10 presents typical circuits for the multiplexer 38, the protection circuits 43 and the current sensor 42. One version of the SCR bypass circuit 44 is shown in FIG. 11. FIG. 12 illustrates typical circuits for the detectors 31 and 32, FIG. 13 shows circuits usable for switches 24 and 28, and FIG. 14 illustrates appropriate circuits for drivers 39.

I claim:

1. A control system for continuously, selectively reducing power consumption in an inductive lighting installation energized from an A.C. power source, the installation including at least one ga discharge lamp such as a fluorescent lamp energized through any of a plurality of different types of electromagnetic ballast having different harmonic distortion characteristics, the control system comprising:

load energizing circuit means, including a signal-actuated normally-closed primary switch, for connecting an A.C. power source to the lighting installation;

a signal-actuated, normally-open secondary switch connected in parallel with the lighting installation;

actuation means for generating actuation signals and applying such actuation signals to the primary and secondary switches to actuate the primary switch open and to actuate the secondary switch closed in approximate time coincidence in each half-cycle of the A.C. power;

zero-crossing detector means for generating zero-crossing signals at times TX indicative of zero-voltage transitions in the A.C. power;

and program means, connected to the zero-crossing detector means and to the actuation means, programming the actuation means to generate (a) power reduction actuation signals at times T1 and T2 in each half-cycle of the A.C. power, (b) a first filter actuation signal at a time T3 prior to each zero-crossing time TX, and (c) a second filter actuation signal at a time T4 following each zero-crossing time TX;

the program means including a plurality of programs each establishing a set of times T1, T2, T3 and T4 for several different power reduction levels for a particular type of ballast;

and selection means for selecting a program to match the ballast type of the load.

2. A power reduction control system for an inductive lighting installation according to claim 1 in which, in each program stored in the program means, the first filter time T3 is constant for all power reduction levels.

3. A power reduction control system for an inductive lighting installation according to claim 2 in which, in each program stored in the program means, the second filter time T4 is constant for all power reduction levels.

4. A power reduction control system for an inductive lighting installation according to claim 1 in which the time interval T3-T4 remains constant, relative to the zero crossing time TX, for all power reduction levels.

5. A power reduction control system for an inductive lighting installation according to claim 1 in which the program includes N recorded programs, each establishing a series of sets of times T1, T2, T3 and T4 for several different power reduction levels for a particular type of electromagnetic ballast, with the combination of the times T3 and T4 different for each power reduction level.

6. A power reduction control system for an inductive lighting installation according to claim 1, and further comprising:

signal detector means for detecting unusual power input conditions to the lighting installation;

and protection circuit means, having an input connection from the signal detector means, for generating protection signals in response to detection of an unsafe power input condition.

7. A power reduction control system for an inductive lighting installation according to claim 6 in which a protection signal from the protection circuit means is applied to the actuation means to assure maintenance of the secondary switch in open condition regardless of occurrence of either of times T1 and T3.

8. A power reduction control system for an inductive lighting installation according to claim 7 and further comprising:
a signal-actuated bypass circuit connected in parallel with the primary switch;
and in which a protection signal from the protection circuit means is applied to the bypass circuit to bypass the primary switch regardless of occurrence of either of times T1 and T3.

9. A power reduction control system for an inductive lighting installation according to claim 6 and further comprising:
a signal-actuated circuit breaker in series with the primary switch in the load energizing circuit means;
and in which a protection signal from the protection circuit is applied to the circuit breaker to actuate the circuit breaker to open condition.

10. A power reduction control system for an inductive lighting installation according to claim 1 in which the timing of the actuating signal to the primary switch is independent of the signal to the secondary switch with the condition that both switches cannot both be closed at the simultaneously so that there can be no short circuit of the lighting installation.

* * * * *